7814X
R. Kendall.
Grist Mill.
Patented Nov. 19, 1833.
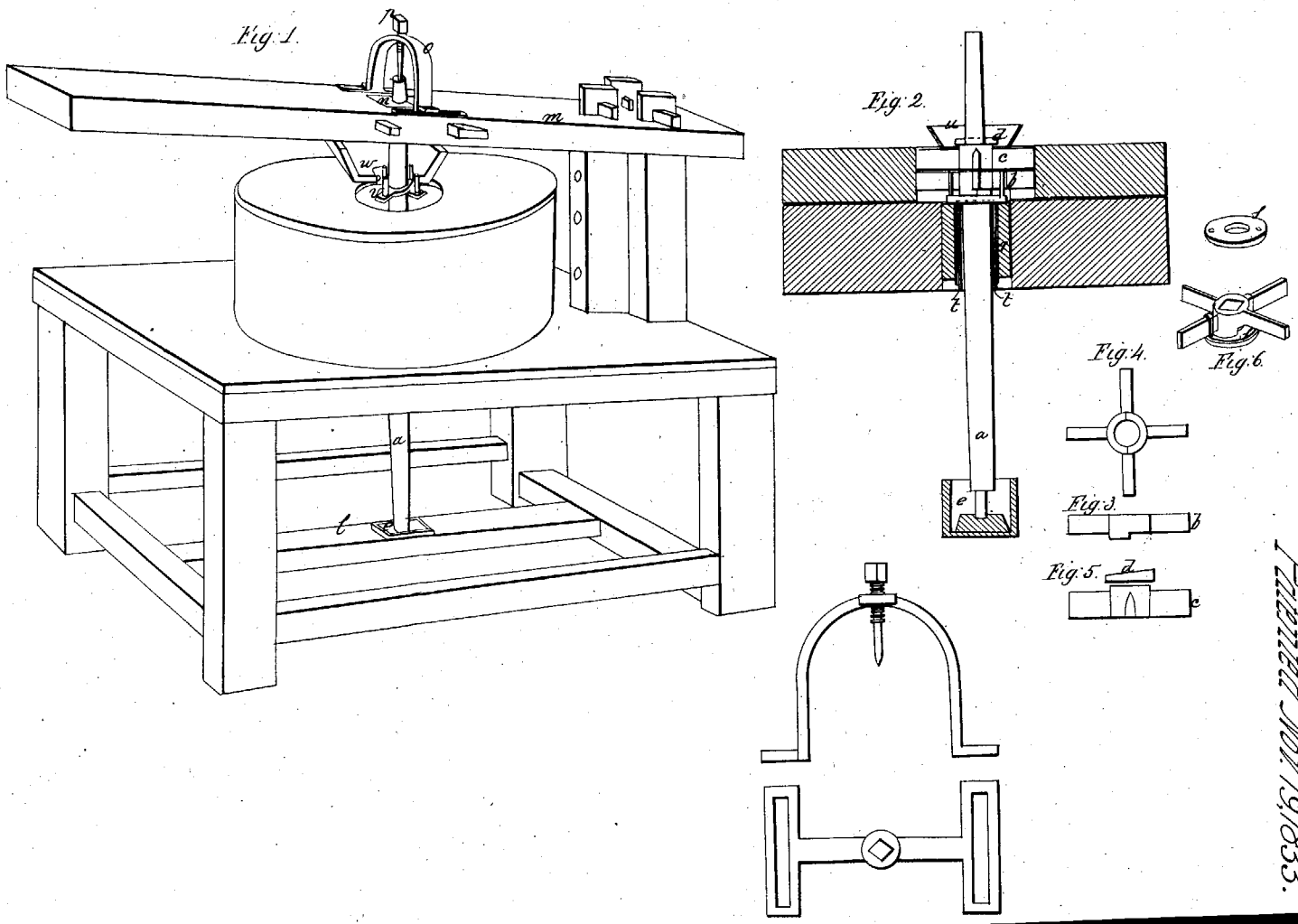

Reuben Kendall, Wilkes County, Georgia.

Letters Patent.

The Schedule referred to in these Letters Patent and making
part of the same, containing a description in the words of the said
Reuben Kendall, himself of his Improvement in the Grist Mill.

To all to whom these presents shall come.

Be it known that I Reuben Kendall of Wilkes County & State of Georgia
have invented a new & useful improvement in running of Mill Stones,
& that the following is a full & exact description of the construction
& operation of the said Machine as invented or improved by me.
A spindle extends from the bridge tree thro' both stones one foot
above the runner, the spindle is about three inches square near
the lower end four inches in diameter, at the shoulder & round
from thence down, about six inches above at the shoulder three
inches in diameter, two inches at the upper end in diameter
& round from thence to the shoulder, the runner is confined
to the spindle, by two drivers, one inserted in the face of the run
-ner about two inches deep, the other inserted on top a little
below the surface; both the drivers are neatly fitted in, that
the spindle in passing thro' the eye of the runner may stand
perpendicular from the face of the same, the lower driver has
four bars about six inches long & two square projecting from
the collar, that being two & half inches deep & three fourths of an
inch thick, having one half of the circumference on the lower
edge taken out three fourths of an inch deep from the edge (see
lower driver) a gain or mortise in the shoulder of the spindle
receives this projection on the driver which prevents the spindle
from turning in the driver & propels the runner, the upper driver
has four bars six inches long, three inches wide & one & a half
thick these bars are bevelled to an edge on top to prevent the grain
from

78147 from bounding out of the eye as it falls from the shoe, the collar
is four inches deep & half an inch thick (see upper driver) the
drivers made in this manner are of wrought iron; drivers may
be cast sufficiently large with three bars to answer the pur=
pose. an iron key passes thro' the spindle above the upper dri-
ver forcing it down on the runner, lower driver & the shoul
-ders of the spindle (see spindle) by this means the runner is
made firm on the spindle, the lower end of the spindle runs
in an ink in the bridgetree, the upper end is confined by a beam
ten feet long, twelve inches wide, & six inches thick, the spindle pass=
ing thro' the center of the beam; a box of wood or metal is let in on the
top of the beam each side of the spindle, six inches long, four inches deep
& two thick (see view of the box & top view of the beam) these boxes are
kept tight on the journal of the spindle by keys passing thro' the beam one
inch thick, about two inches from the top of the beam passing thro' a part
of the boxes, over the spindle on the beam is a stirrup with a screw to run
down in the end of the spindle to prevent the spindle from rising or to
add any weight to the runner that may be necessary; two bolts pass
thro' the beam with screw & tap to confine the stirrup, a mortice in the
foot of the stirrup three inches long for the bolts admits of the stirrup
being moved each way lengthwise with the beam (see side end & top
view of the stirrup) if in raising or lowering the bridgetree the spindle
should be thrown from a perpendicular the same can be made perpen
-dicular by the keys slipping the stirrup to suit the spindle; the screw
in the stirrup is pointed with steel & passes into an ink in the end of
the spindle, the posts to support the beam, are one piece two feet by six
inch. s at the base having two tenons that pass thro' the beam six inches by three
another piece ten inches by four at the base having one tenon four inches
by two & a half, this piece is pinned to the first mentioned piece on one
side in the center edgewise this forms a post with three tenons passing
thro' the beam, keys are put thro' these tenons above the beam to keep it firm
(see side view & end view of the post) the posts can be framed into the
husk-frame plates or cap plates framed into the other work & the posts
framed.

framed into them as may be convenient. In the eye of the bed stone
fit in a piece of wood endwise ten inches long with a hole in the cen-
tre five inches in diameter for the spindle to pass thro', a cap of sheet iron
six inches in diameter rim about an inch deep with a hole cut in the
heading large enough for to fit the spindle below the shoulder this cap
is made fast to the lower driver by two staples round the bar, a tube
of sheet iron, five inches in diameter & twelve long passes thro' the hole
in the bush extending up under the cap as near the heading as possible
to not touch it. the tube can be kept in place by some wedges, passing
between the bush & the tube, this prevents the grain from passing thro'
the bush, a tube of tin may be fitted in the eye of runner reaching nearly up
to the shoe to prevent the grain from bounding out. A rattler is made
of two pieces of sheet iron about five inches in diameter with a hole cut in each
to receive the spindle & with four or six rounds of iron six inches long thin
fitting tight on the spindle answers for the rattle staff. The bridge tree o-
ught to run parallel with the beam that the spindle may be kept
perpendicular. this plan may be applied to tub mills as well as geared.

Witnesses
James Jones
Edw. R. Anderson

Reuben Kendall.

Ex[illegible]
[illegible]

1120 Words]